United States Patent [19]

Bergendahl

[11] 4,368,165

[45] Jan. 11, 1983

[54] ROLL PRESS AND METHOD OF REGULATION OF THE THROUGHPUT OF A ROLL PRESS

[75] Inventor: Hans-Georg Bergendahl, Bochum-Weitmar, Fed. Rep. of Germany

[73] Assignee: Maschinenfabrik Koopern GmbH & Co. KG, Hattingen, Fed. Rep. of Germany

[21] Appl. No.: 215,990

[22] Filed: Dec. 12, 1980

[30] Foreign Application Priority Data

Dec. 13, 1979 [DE] Fed. Rep. of Germany ....... 2950072

[51] Int. Cl.[3] .......................... B29C 3/02; B29C 3/06; B29C 15/00

[52] U.S. Cl. .................................. 264/40.4; 264/40.7; 425/145; 425/148; 425/237; 100/45; 100/47; 100/49; 100/173; 425/149

[58] Field of Search ....................... 100/35, 43, 45, 47, 100/49, 173; 264/40.1, 40.4, 40.7, 40.5; 425/140, 141, 145, 148, 149, 150, 237, 367

[56] References Cited

U.S. PATENT DOCUMENTS 3,734,659 5/1973 Harris ................................. 425/237

3,781,151 12/1973 Harris ................................. 425/237

3,824,054 7/1974 Harris ................................. 425/237

3,901,635 8/1975 Greenberger ....................... 425/145

*Primary Examiner*—Peter Feldman

*Attorney, Agent, or Firm*—Salter & Michaelson

[57] ABSTRACT

Method of regulating the throughput of a roll press having press rollers, a variable-speed drive motor for said press rollers and a feed device having a controllable throughput. Both the speed of the drive motor and also the throughput of the feed device are regulated automatically in two control modes which succeed one another from time to time. During the first control mode, under nominal loading, the roller speed is increased until the actual loading falls below the nominal loading; at less than the nominal loading the feed throughput is increased until the nominal loading has been attained, and after a condition has been reached in which the nominal loading has not been attained by increasing the throughput, the regulation is changed over to the second control mode. During the second control mode, at less than the nominal loading, the roller speed is reduced until the nominal loading has been attained; at the nominal loading the feed throughput is reduced until the loading falls below the nominal value, and after the loading has fallen below the nominal value, during the second control mode, there is a change-over to the first control mode.

14 Claims, 4 Drawing Figures

FIG. 1
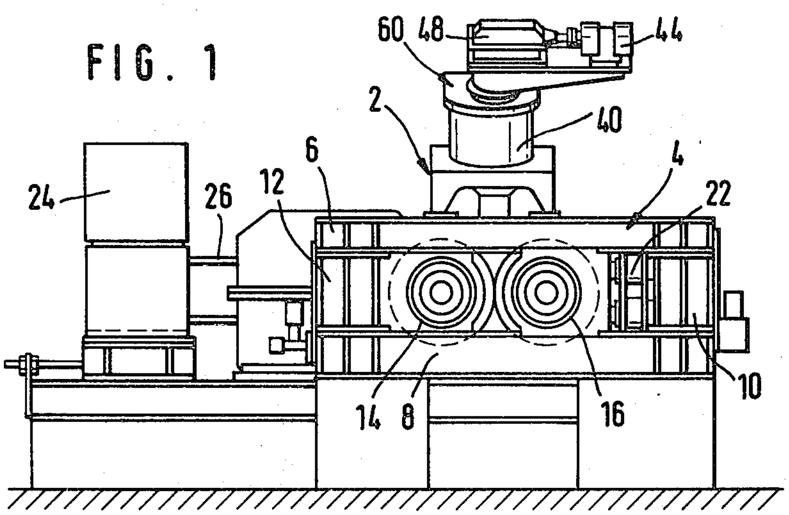
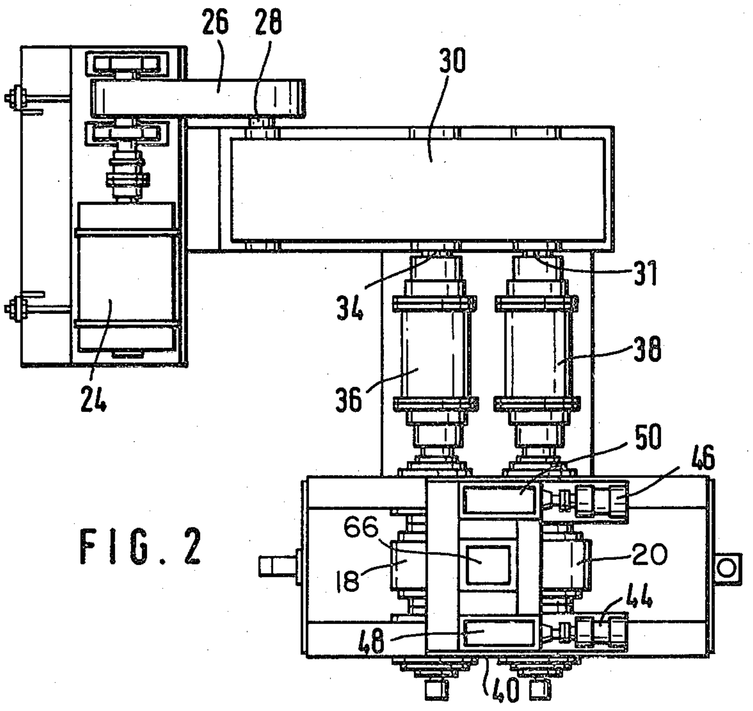
FIG. 2

ROLL PRESS AND METHOD OF REGULATION OF THE THROUGHPUT OF A ROLL PRESS

FIELD OF THE INVENTION

The invention refers to a roll press and a method of regulation of the throughput of a roll press having press rollers located side-by-side, a variable-speed drive motor for the press rollers and a feed device with a controllable throughput.

The roll press can be used either for briquetting, with briquette moulds disposed on the rollers, or for compacting, the rollers then being embodied, as plain rollers or as slightly wafered rollers.

DESCRIPTION OF THE PRIOR ART

In roll presses that have charging screw conveyors as the feeding device, it is known to vary the amount of briquetting material delivered, by regulating the speed of the screw-conveyor drive motors. Alternatively in roll presses having a gravity feed, it is also known to adjust the amount of briquetting material delivered, by means of a tongue control with the aid of a servo-motor. In this way it is possible, by regulating the screw conveyor speed or the position of the control tongue, to compensate the roll press for fluctuations caused by the properties of the briquetting material.

It is also known to furnish roll presses with adjustable-speed motors. In such roll presses the speed of the roll presses is adjusted manually to a speed corresponding to the average throughput of the feed device. It is further known, by means of a signal from a unit inserted upstream of the nip between the rollers (e.g. a unit responsive to hopper filling level—or a unit responsive to weight of material on a conveyor type weigher) giving an "actual value", to match roll presses having controllable drives and controllable feed devices to the quantity of press material supplied. This type of regulation is subject to the proviso that suitable sensors can be fitted.

An object of the invention is to provide a method of regulating the throughput of a roll press which, even with relatively large fluctuations of the amount of material delivered and/or fluctuations of the composition of the material, ensures satisfactory results in operation.

SUMMARY OF THE INVENTION

This problem is solved, in that both the speed of said drive motor for said rollers and also the throughput of said feed device have respective rated values corresponding to a nominal loading of said roll press, and are regulated automatically in two control modes which succeed one another from time to time in such a way that:

(I) during said first control mode (a) under nominal loading—the roller speed is increased until the actual loading falls below said nominal loading, (b) at less than the nominal loading—the feed throughput is increased until the nominal loading has been attained, and that after a condition has been reached in which the nominal loading has not been attained by increasing the throughput, the regulation is changed over to said second control mode, (II) during said second control mode (a) at less than said nominal loading—the roller speed is reduced until said nominal loading has been attained, (b) at said nominal loading—the feed throughput is reduced until the loading falls below said nominal value, and that after the loading has fallen below said nominal value, during said second control mode, there is a change-over to said first control mode.

The special feature of the method of regulation according to the invention consists of the fact that, in contrast to the abovementioned known controls, upon reaching agreement between the rated value and the actual value, the regulation does not endeavour to maintain this condition but immediately undertakes an optimal adjustment to the flow rate of the briquette material by bringing about an ingenious divergence of the actual value from the rated value.

Advantageous features of the method of regulation set out hereinbefore are set out in the following example.

BRIEF DESCRIPTION OF THE DRAWINGS

By way of example a roll press in accordance with the invention and a method of regulation of the throughput of the roll press are now described in detail with reference to the accompanying drawings, in which:

FIG. 1 is a side view of the roll press;

FIG. 2 is a plan view of the roll press shown in FIG. 1;

DESCRIPTION OF THE PREFERRED EMBODIMENT

Figure 3:
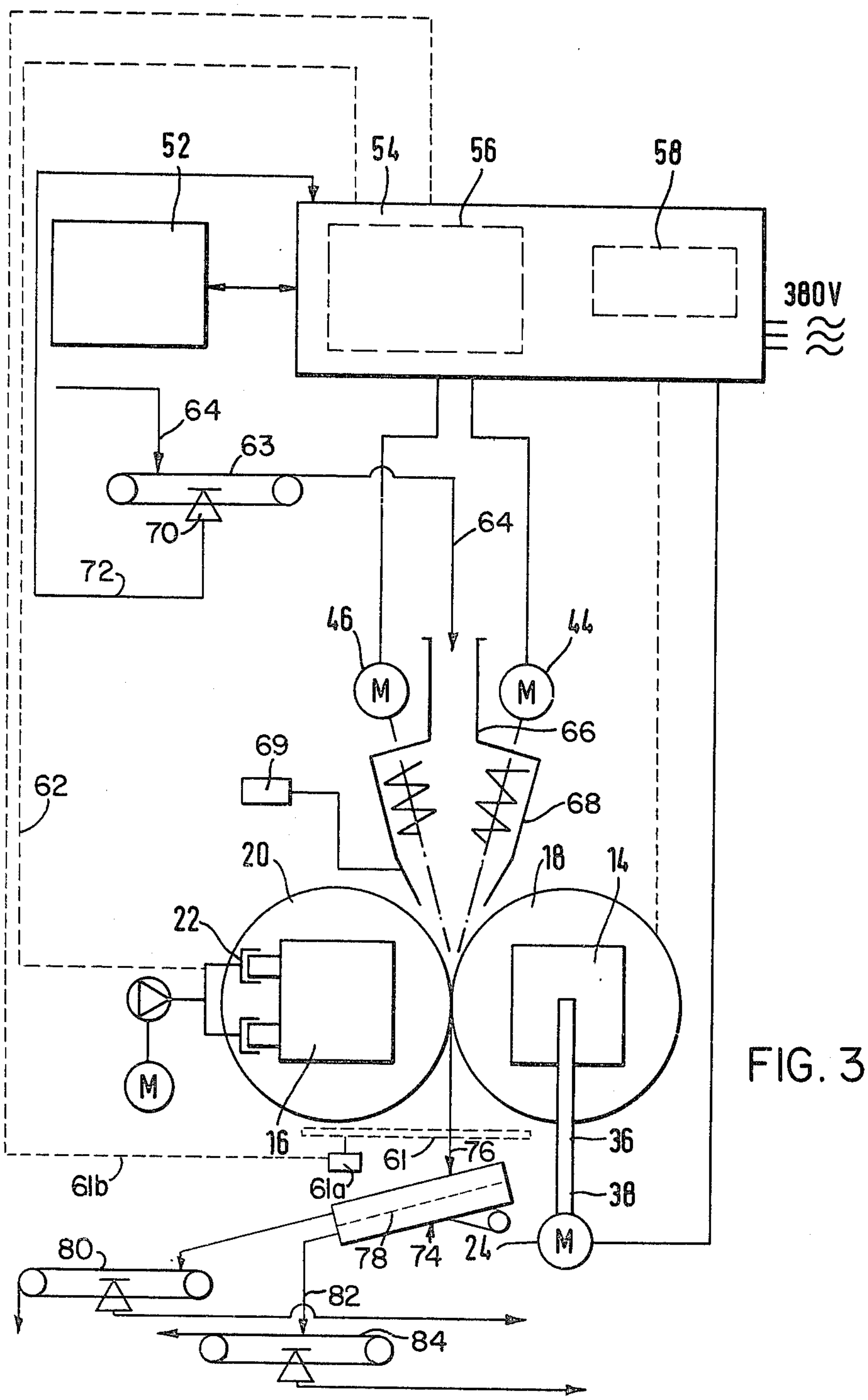
FIG. 3 shows schematically a roll press and appropriate means of regulation and control.

The roll press 2 shown in FIGS. 1 and 2 has a roller frame 4 having an upper longitudinal girder 6 and a lower longitudinal girder 8 which are joined together by the intermediate frame pieces 10 and 12. In the space between the girders 6 and 8, bearing blocks 14, 16 of the two press rollers 20 and 18 are mounted. The roller 20 with its bearing blocks 14 rests against the intermediate frame piece 12 and the roller 18 with its bearing blocks 16 lies against a hydraulic support 22 which in its turn is supported on the intermediate frame piece 10.

A variable-speed electric motor 24 is provided as the drive. This may be for example a direct-current motor, or a polyphase induction motor with frequency-dependent control. The motor 24 drives, via a belt drive 26, the input shaft 28 of a reduction gear 30, which has two output shafts 34, 32 driven in contra-rotation at equal speeds and which are connected via clutch shafts 36, 38 to drive journals of the rollers 18 and 20. A feed device 60 for the material to be briquetted is provided above the frame. This consists, in this example of the two screw conveyors 40 through which the material to be briquetted or compacted is fed into the intake gap between the two rollers 18, 20 and at the same time undergoes a preliminary compression.

Variable-speed motors 44, 46 are provided as the drive for the screw conveyors 40 of the feed device. The motors 44, 46 are coupled with the primary shafts of respective bevel reduction gears 48, 50, to the output of which the shafts of the feed screw conveyors 40 are coupled. The drive motors 44, 46 may be electric motors, such as direct-current motors or frequency-controlled polyphase induction motors, or variable-speed hydraulic motors. The speed of the polyphase induction motors, where used, is changed by varying the frequency of the current by adjusting the voltage.

The roll press, has (as shown schematically in FIG. 3) a manual control 52 and an automatic regulator, for control in accordance with the invention. The manual control and the automatic regulator are operable alternatively. In the block 54 which represents the automatic regulator, a frequency control 56 and a rectifier 58 for the power supply to the drive motors 44, 46 of the feed screw conveyors 40 are indicated.

The material input 60 (shown in FIG. 1) is represented schematically in FIG. 3 as a screw feed having compressor screws and the variable-speed motors 44, 46. It may alternatively be a gravity feed device including a regulating tongue into which the material to be compressed is fed. The material may be delivered by a conveyor belt or like device.

In the method of control in accordance with the invention, both the speed of the driving motor 24 for the rollers 18, 20 and also the throughput of the feed device 60 are automatically regulated in two control modes which succeed one another from time to time, rated values of speed and throughput corresponding to a nominal loading of the roll press, in such a way that:

(I) during said first control mode (a) under nominal loading—the roller speed is increased until the actual loading falls below said nominal loading;

(b) at less than the nominal loading—the feed throughput is increased until the nominal loading has been attained, and after a condition has been reached in which the nominal loading has not been attained by raising the throughput, the control is changed over to said second control mode, (II) during said second control mode (a) at less than said nominal loading—the roller speed is reduced until said nominal loading has been attained.

(b) at said nominal loading—the feed throughput is reduced until the loading falls below said nominal value, and that after falling below said nominal loading, during said second control mode, there is a change-over to said first control mode.

Preferably the regulation is achieved in dependence on the current taken by the roller drive motor 24, as an "actual value". It is also possible to take the position of the roller 18 of the press as the actual value, where the roller 18 is permitted to "idle" and to be displaced against the support 22. The roller 18 in this context is referred to hereinafter as the "idle" roller. Another possibility is to employ, as the actual value, stress in the press framework, the stress being ascertainable by means of an extensometer strip or strain gauge. Finally it is possible to enlist the pressure in the hydraulic support 22 of the idle roller 18 as the actual value of the loading of the press. A frame 61 of the press and a strain gauge **61*a* attached to the frame 61 are schematically illustrated as an alternative embodiment in FIG. 3. The gauge 61*a* is connected to the regulator 54 with a dotted line 61*b*. The connection of the support 22 to the regulator 54 is illustrated as an alternative embodiment in FIG. 3 by a dotted line 62**.

Figure 4:
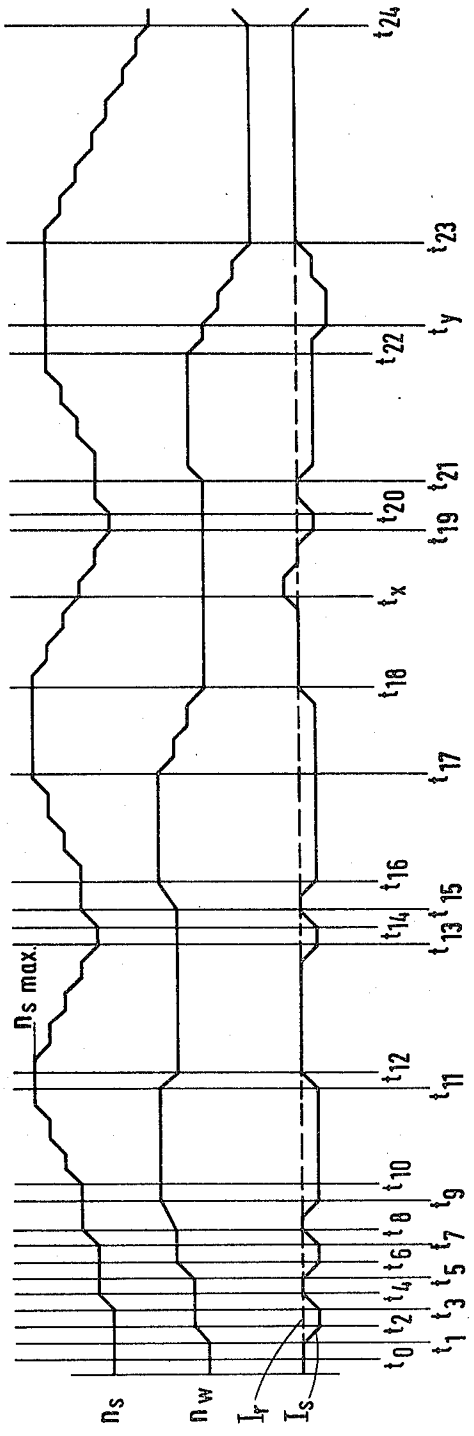
FIG. 4 illustrates graphically the method of regulation of the throughput of the roll press in accordance with the invention.

FIG. 4 represents graphically the regulation of a roller briquette press in which the material feed device is at least one conveyor screw. In the graphical representation, the current intake $I_s$ of the drive motor, the roller rotational speed $n_w$ and the screw rotational speed $n_s$ are plotted one above the other. Alterations of these values during the regulation are represented in each case by sloping transistions between straight horizontal lines representing respective operating states.

The prescribed rated value of the current for the roller drive motor 24, which corresponds to the nominal loading of the roll press, is denoted by $I_r$ and is drawn as a broken line. In the graph this line $I_r$ coincides at times with the line for the current intake $I_s$. In such a case an agreement prevails between the rated and the actual values of the current of the roller drive motor 24. The rated value can be pre-adjusted according to the requirements of the briquette material, especially to the type and condition of the material to be compressed and to an average quantity of material.

In starting up the roll press, first the speed $n_w$ of the rollers 18, 20 and the speed $n_s$ of the drive motors 44, 46 of the feed conveyor screws are harmonized with one another by the manual control 52 in such a way that with a current intake $I_r$ of the roller drive motor 24 an optimal compression is achieved, and so briquettes having the desired properties are produced. With a prescribed quantity of material, which, for example, corresponds to the average quantity of material, the current intake of the roller drive motor 24 which is adjusted to optimal compression can be prescribed as the rated value $I_r$ for the regulation. A manually controlled operating point is given in FIG. 4 for a time $t_o$. When the roll press has been adjusted manually to this operating point $t_o$, automatic regulation is switched on.

The regulation starts with said first control mode. As the loading of the press corresponds to the nominal load, the roller speed $n_w$ is increased at time $t_1$, until, according to the diagram, the current intake $I_s$ falls at a time $t_2$ below the rated value because due to increased throughput of the press rollers 18, 20 while throughput of the feed conveyors remains constant, the loading of the press decreases. When the current $I_s$ has fallen below the rated value $I_r$, after an interval $t_2$–$t_3$, which may even be zero, the rotational speed $n_s$ of the feed conveyor screws is raised until at time $t_4$, the rated value of current $I_r$ is reached again. After a further period of time $t_4$–$t_5$, which again may be zero, the roller speed $n_w$ is again increased, until at time $t_6$, the current $I_s$ again falls below the rated value $I_r$. At the time $t_7$, which again may be identical with the time $t_6$, the rotational speed $n_s$ of the feed conveyor screws is increased until at time $t_8$, the rated current $I_r$ is again reached.

With the control steps described above, the press has followed an increasing supply of material, as ensues from the fact that it has always been possible by raising the throughput of the feed conveyors from time to time to reach the rated current intake at the set rotational speed $n_w$ of the press rollers. As the nominal current $I_r$ is attained at the time $t_8$, a further increase of the roller speed $n_w$ ensues, until the current again falls below the rated value at time $t_9$. At time $t_{10}$, which as before may be identical with time $t_9$, the rotational speed $n_s$ of the feed conveyor screws is increased, but without thereby attaining the rated current $I_r$. When the rated current $I_r$ can no longer be attained after a prescribed time interval $t_{10}$–$t_{11}$, or after reaching the maximum speed of the feed conveyor screws, the regulation is switched over to the second control mode, at time $t_{11}$ in this case.

In the second control mode, with a current $I_s$ less than the rated current $I_r$, the roller speed $n_w$ is reduced until the rated current $I_r$ has been attained again. On attaining the rated current $I_r$, the rotational speed $n_s$ of the feed conveyor screws is reduced until at time $t_{13}$, the reduction in the feed conveyor speed results in reduction of the current $I_s$ below the rated current $I_r$. When the current $I_s$ falls below the rated current $I_r$ the method of regulation changes back again to the first control mode at time $t_{13}$. As the current $I_s$ has fallen below the rated current $I_r$ at time $t_{13}$, there next ensues at time $t_{14}$ an increase in the speed $n_s$ of the feed conveyor screws. This leads to re-attainment of the rated current at $t_{15}$. The roller speed is then increased until the actual current $I_s$ is less than the rated current $I_r$ at time $t_{16}$. The ensuing regulation between times $t_{16}$ and $t_{17}$ corresponds to that between times $t_9$ and $t_{11}$ described hereinbefore. As the maximum speed of the feed conveyor screws is reached at time $t_{17}$, without the rated current $I_r$ having been attained again, a change-over to the second control mode ensues. Starting from time $t_{17}$, the roller speed $n_w$ is reduced until the rated current $I_r$ is attained again at time $t_{18}$. At time $t_{18}$ the speed $n_s$ of the feed conveyor screws is reduced until the actual current $I_s$ has again fallen below the rated current $I_r$ at time $t_{19}$. This is once more the criterion for changing over to the first control mode. As the actual current $I_s$ is lower than the rated current $I_r$, there next ensues, from time $t_{20}$ onwards, a rise of the feed conveyor speed $n_s$ with attainment of the rated current $I_r$, and following at time $t_{21}$ an increase of the roller speed $n_w$. At time $t_{22}$ at which the feed conveyor screws may not have reached their maximum speed, but at which a prescribed time has elapsed since time $t_{21}$, there is another change-over to the second control mode, because after that time the rated current $I_r$ is not reached again as a result of raising the speed $n_s$ of the feed conveyors. Starting from time $t_{22}$, the roller rotation speed $n_w$ is reduced until the rated current $I_r$ is again reached at time $t_{23}$. As can be seen from FIGS. 4, a substantial reduction of the roller rotation speed $n_w$ is necessary here in order to reach the rated current $I_r$. This means that the amount of material fed into the press has been greatly diminished. Starting from time $t_{23}$, the rotation speed $n_s$ of the feed conveyors is then reduced until, at time $t_{24}$, the actual current $I_s$ again falls below the rated current $I_r$ and, at a very much reduced throughput of the roll press, the method of regulation is once more changed over to the first control mode.

During the regulation as described, either the rotational speed $n_w$ of the press rollers or that of the feed conveyor $n_s$ is continually varied in accordance with the stated control modes, during which, when the roller speed $n_w$, is varied, the rotational speed $n_s$ of the feed conveyor screws remain steady, or conversely.

With the regulation in accordance with the invention, the roll press adapts itself to the prevailing amount of material fed in, by varying the rotational speed of the press rollers, while the regulation of the rotational speed of the feed conveyors ensures that the load on the press is always adjusted to the throughput prescribed by the speed of the press rollers, and that an optimal compression of the material to be briquetted or compacted is guaranteed. It is thereby possible to achieve optimal operating conditions with a wide range of fluctuation both with regard to the amount of material fed in and with regard to the packing density of the material. The range of fluctuation may for instance lie between 50% and 300% of the average amount of material compressed. It is therefore possible to operate a roll press even with extreme fluctuations of the amount compressed, such as a rise in separation processes with variable throughput or with intermittent operation, without overflow. Fluctuations of the density of the material are then also controlled within the fluctuation range of the amount of material.

By introducing variable time constants for the regulation, the rapidity of the regulation can be influenced. For example, the time constants may be specified in dependence on variation of rate or quantity of the material compressed. Also additional provisions may be included in the regulation. Thus for example the material can be conveyed via a conveyor-type weigher to the roll press, and the measurement by the weigher can be introduced as a provision to modify the regulation. It is further possible to determine the quantity of fine material present after compression in the press or the proportion of fine material to coarse material or to the total material which has been compressed, and in dependence thereon to adjust the operating parameters of the roll press suitably, for example to raise the nominal load of the press and thereby the line pressure in the gap between the rollers of the press and to lay down this altered loading value as the rated value for subsequent regulation. In this way the composition of the compressed material may be corrected or modified.

Referring to FIG. 3, it is seen that a band conveyor scale 63 is provided to determine the weight of a feed material 64 which is fed to the feed screw conveyors 40. The feed material 64 is fed to the conveyor 63 and it is then supplied to a feed chute 66 and on to the feed screws 40. The screws 40 are disposed within a housing 68 having an outlet end of variable cross-sectional area which is controlled by a servo motor 69. A weighing means 70 of the conveyor scale 63 provides a signal 72 which is supplied to the regulator 54. A sieving device 74 is provided at the outlet of the rollers 18 and 20 to receive compacted material therefrom which is indicated schematically by the arrow 76. The coarse material 78 from the sieving device 74 is charged to a band conveyor scale 80 while fine material 82 dropping through the sieving device 74 is charged to a band conveyor scale 84. The respective values representing the weights of the materials 82 and 78 as determined by the respective conveyor scales 84 and 80 are then used in the regulation as above described.

The consideration of a multiplicity of parameters is made much easier by the use of a microprocessor. With the use of a microprocessor it is possible, for instance, to carry out the regulation with an electronic interrogating circuit, by means of which the actual value of the current intake is established in terms of differences, and in dependence thereon the control gear corresponding to the control mode prevailing is treated in the form of a control pulse. With such an interrogating circuit it is possible by simple variation of the time intervals of the individual interrogations to adjust the rapidity of regulation to prevailing operating parameters. The control pulses may at any time be constant so that they lead to specified alterations of the rotational speeds of the press rollers and the feed conveyor screws, in the direction specified by the control mode at the time. The regulation then ensues stepwise, as is illustrated in FIG. 4. The steps may be specified to be very small. The actual or rated value for the loading of the roll press may alternatively or additionally to the current intake of the roller drive be derived from the displacement travel of or load or pressure on the aforesaid idle roller of the roll press. The displacement of the idle roller is proportional to the loading of the press. It is also possible to measure the stresses in the press framework, and to introduce a stress as a rated or actual value. The stresses in the roller frame can be determined by extensometer strips or strain gauges. It is also possible to determine the loading of the press by means of the load or pressure acting on supporting hydraulic mountings or systems. Also combined load-value tests are possible. For instance in addition or alternatively to deriving the rated value of the loading by measurement of the current intake of the drive motor, the same can be achieved by measuring the displacement of the idle roller or the load or pressure acting thereon. If a difference should be revealed between the displacement of the bearing housing of the idle roller on the two sides of the press as a result of an inclined position of the idle roller during operation, the rotational speed of one of the feed conveyor screws may be suitably altered, whereby non-uniformities of the feeding, which have led to the inclined position of the idle roller, are compensated. It is also possible to adjust the rotational speed of the two feed conveyor screws in opposite senses.

Apart from the parameters that have been described, an increase or decrease of the actual loading compared with the nominal loading by a specified amount may be inserted in the regulation as a further parameter. In the graph of FIG. 4, such an increase in the actual current over the rated current is depicted at an instant $t_x$ between $t_{18}$ and $t_{19}$. Such an exceeding of the rated current by a prescribed amount (which for example is to be attributed to an increase of the packing density) can be followed by regulation through rapid reduction of the rotational speed of the feed conveyor screws, in order to break up a congestion in the roller gap immediately.

Similarly a decrease in the actual current relative to the rated current by a specified amount is illustrated, at an instant $t_y$ between $t_{22}$ and $t_{23}$. This decrease in actual current relative to the rated current is an indication that the press rollers are operating with insufficient filling. Depending on this, a rapid reduction of the roller speed can then be carried out.

Although the feed conveyor described in the foregoing example is of the screw type, another type of feed conveyor may be used. For example, a gravity feed device having a variable cross-section outlet which is variable by a servo-motor.

What I claim as my invention and desired to secure by Letters Patent of the United States is:

1. A method of regulating the operation of a roll press of the type having a pair of cooperating side-by-side press rollers, a variable speed drive motor for rotating said press rollers, a variable rate feed device which feeds material to said rollers and means for evaluating the degree of loading of said rollers comprising:

(a) operating said press under a first control mode wherein;

(1) when said press is at a loading which is equal to the nominal loading thereof, the speed of said rollers is increased until the actual loading of said press is less than said nominal loading;

(2) when said press is at a loading which is less than the nominal loading thereof, the rate of said feed device is increased in an attempt to increase the loading of said press to the nominal loading thereof;

(3) if after increasing the rate of said feed device a predetermined amount the loading of said press is still less than the nominal loading thereof, the control of said press is effected by;

(b) operating said press under a second mode wherein;

(1) when the loading of said press is less than the nominal loading thereof, the speed of the rollers is reduced until the loading of said press equals the nominal loading thereof;

(2) when the loading of said press equals the nominal loading thereof, the rate of said feed device is reduced until the loading of said press is less than the nominal loading thereof and the operation of said press is returned to said first control mode.

2. The method of regulation according to claim 1, wherein the rapidity of regulation is adjustable in dependence on at least one of the magnitude and the rapidity of loading variations.

3. The method of regulation according to claim 2 wherein the rapidity of regulation is varied in dependence on specified deviation of actual loading from said nominal loading.

4. The method of regulation according to claim 1 wherein the rapidity of regulation is varied in dependence on specified deviation of actual loading from said nominal loading.

5. The method of regulation according to claim 1 wherein the material supplied is weighed before feeding into said feed device and the weight of material is applied as a provision to modify the regulation.

6. The method of regulation according to claim 1 wherein the quantity of fine material in the compressed material after compression in the press is measured and said nominal loading of said roll press is varied in dependence on said quantity of fine material.

7. The method of regulation according to claim 1 wherein the proportion of fine material in the compressed material after compression in the press is determined and said nominal loading of said roll press is varied in dependence on said proportion.

8. The method of regulation according to claim 1 wherein the current intake of the drive motor for the rollers of said roll press is employed as an "actual" value for the loading of said roll press.

9. The method of regulation according to claim 1 wherein the displacement of an idle roller of said roll press is determined and employed as an "actual" value of the loading of said roll press.

10. The method of regulation according to claim 1 wherein stress in framework of said roll press is determined and employed to give an "actual" value of the loading of said roll press.

11. The method of regulation according to claim 1 wherein the load on a hydraulic support of an idle roller of said roll press is determined and employed as an "actual" value of the loading of said roll press.

12. In a roll press of the type having a pair of cooperating side-by-side press rollers, a variable speed drive motor for rotating said press rollers, a variable rate feed device which feeds material to said rollers, the improvement comprising means for automatically regulating both the speed of said roller drive motor and the rate of said feed device so that the operation of said press is effected by:

(a) operating said press under a first control mode wherein;

(1) when said press is at a loading which is equal to the nominal loading thereof, the speed of said rollers is increased until the actual loading of said press is less than said nominal loading;

(2) when said press is at a loading which is less than the nominal loading thereof the rate of said feed device is increased in an attempt to increase the loading of said press to the nominal loading thereof;

(3) if after increasing the rate of said feed device a predetermined amount the loading of said press is still less than the nominal loading thereof, the control of said press is effected by;

(b) operating said press under a second mode wherein;

(1) when the loading of said press is less than the nominal loading thereof, the speed of the rollers is reduced until the loading of said press equals the nominal loading thereof;

(2) when the loading of said press equals the nominal loading thereof, the rate of said feed device is reduced until the loading of said press is less than the nominal loading thereof and the operation of said press is returned to said first control mode.

13. A roll press as claimed in claim 12 in which said feed device includes at least one feed screw having a variable speed of rotation.

14. A roll press as claimed in claim 12 in which said feed device is of a gravity feed type having an outlet of variable cross-sectional area and a servo-motor by which said outlet area is varied.

* * * * *